United States Patent [19]
Tolson

[11] Patent Number: 5,787,682
[45] Date of Patent: Aug. 4, 1998

[54] METHOD AND APPARATUS FOR SHRINKING END SEAMS IN A FILM WRAPPED AROUND A PRODUCT

[75] Inventor: Sydney S. Tolson, Scotland Neck, N.C.

[73] Assignee: Ossid Corporation, Rocky Mount, N.C.

[21] Appl. No.: 868,495

[22] Filed: Jun. 3, 1997

[51] Int. Cl.⁶ .................................................. B65B 53/02
[52] U.S. Cl. .................................................. 53/442; 53/557
[58] Field of Search .................................. 53/442, 557, 52

[56] References Cited

U.S. PATENT DOCUMENTS

| | | | |
|---|---|---|---|
| 3,710,550 | 1/1973 | Osborne | 53/557 X |
| 4,228,345 | 10/1980 | Stricker et al. | 219/388 |
| 5,546,677 | 8/1996 | Tolson | 53/557 X |
| 5,590,509 | 1/1997 | Esteves et al. | 53/432 |

FOREIGN PATENT DOCUMENTS

| | | | |
|---|---|---|---|
| 666341A | 7/1988 | Switzerland | F26B 21/00 |
| 9000072 | 3/1990 | WIPO . | |

*Primary Examiner*—Linda Johnson
*Attorney, Agent, or Firm*—Olive & Olive, P.A.

[57] ABSTRACT

The invention provides an apparatus and method for shrinking portions of a shrinkable film beneath leading and trailing transverse end seams of a film wrapped product. First and second controllable sources of heated fluid are connected to first and second nozzles positioned beneath a conveyor on which the film wrapped product is conveyed. The nozzles are arranged to travel back and forth below the conveyor and their travel is timed such that the heated fluid from the first nozzle heats only the leading seam and the heated fluid from the second nozzle heats only the trailing seam.

9 Claims, 5 Drawing Sheets

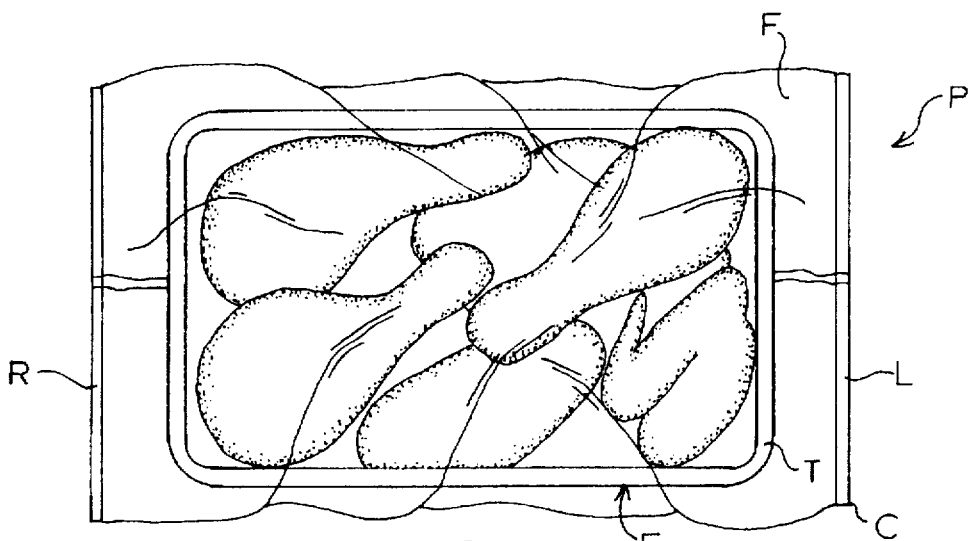
FIG. 3
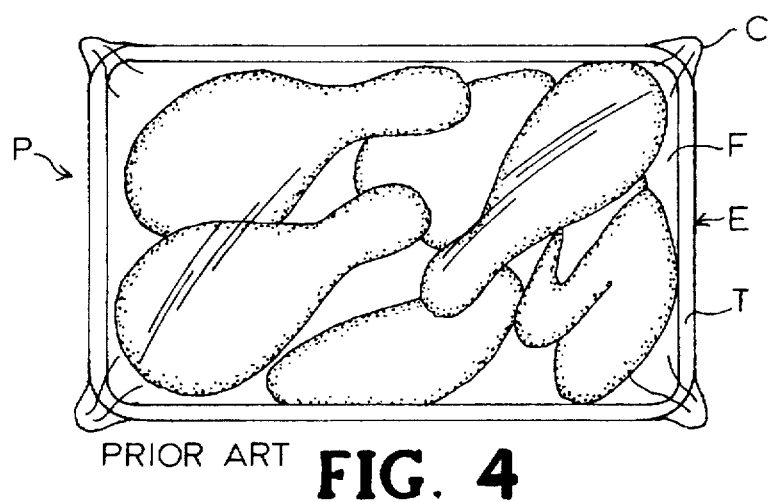
PRIOR ART FIG. 4
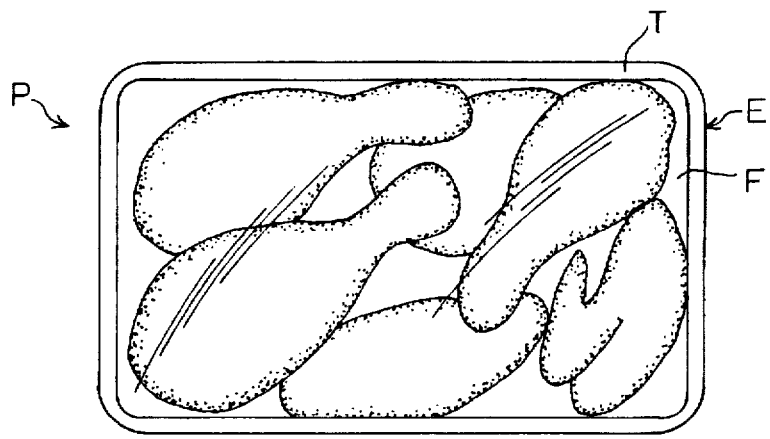
FIG. 5

METHOD AND APPARATUS FOR SHRINKING END SEAMS IN A FILM WRAPPED AROUND A PRODUCT

BACKGROUND OF THE INVENTION

1. Field of the Invention

This invention relates to methods and apparatus for shrinking of a heat shrinkable film wrapped around a product, and more particularly to methods and apparatus for shrinking selected portions of the film adjacent end seams formed by the film wrap.

2. Description of Related Art

A product is typically wrapped in a heat shrinkable film by a process which results in forming an end seam by the application of heat transversely between sequential products. The film is then generally shrunk. The film around each wrapped product has a leading and a trailing transverse end seam. The shrinking is usually done by the application to the film of a heated fluid, typically a gas such as air or steam or a liquid such as water. This shrinking step is mainly undertaken in order to improve the appearance of the final package by the removal of wrinkles in the film.

A particularly important class of products for which film shrinking is needed is that of packaged food products, especially poultry parts. It is common to package poultry parts by placing the poultry parts in a molded tray having a stiffening flange around its upper periphery and wrapping the tray and its contents in a heat shrinkable film. The film is then shrunk. There are certain problems inherent in packaging poultry parts in film which make the shrinking step particularly demanding in order to achieve a relatively smooth appearance. One of the problems is that the transverse end seams formed in the wrapping process typically extend outwardly beyond the tray flange after being sealed; it is desired to cause the sealed end seam to be hidden under the tray flange after shrinking. Another problem is that in cases where the height of the poultry product is greater than twice the height of the flange of the tray, the formed transverse end seams are higher than the flange. This situation makes shrinking the end seams so as to draw each end seam into a position under the flange especially difficult. Furthermore, the seam ends which reside at each package corner are frequently left extended after the film is shrunk so as to be visible beyond the package contours.

Government regulations require the marking of food storage and preparation information on the film. This marking is generally best done on the portion of film which is to be in contact with the bottom of the tray. If this film portion is shrunk by the direct application of heat, the printing frequently becomes distorted and difficult to read, thus not meeting the legibility standards set by the regulations.

Among the numerous prior patents which address the process of film shrinking are U.S. Pat. No. 5,193,290; U.S. Pat. No. 5,398,427; and U.S. Pat. No. 5,546,677 issued to the present inventor. The '677 patent is directed to causing heat to be applied to the transverse seams of the film without directly heating the bottom film portion, as is the present invention. The '677 patent discloses an invention in which the tray is turned 90° to travel "sideways" on its conveyor to facilitate end seam shrinkage. The '290 and '427 patents disclose general film shrinking inventions and provide useful background. The teachings of these prior patents are incorporated herein by reference. The invention disclosed herein achieves end seam shrinkage while not requiring the tray to be rotated, is a novel and especially effective method and apparatus for accomplishing the objects outlined below and, unlike the referred to prior art, is based on movement of sources of heat in coordination with movement of the leading and trailing end seams of the package.

It is therefore an object of this invention to provide a method and apparatus for shrinking the transverse end seams of a heat shrinkable film wrapped around a product so that the seams are pulled inwardly and downwardly.

It is an additional object of this invention to provide a method and apparatus for shrinking the transverse seams of a film wrapped around a product so that the film corners are tucked close to the product.

It is a further object of this invention to provide a method and apparatus for shrinking of the transverse seams without causing distortion of the print on the film on the bottom of the product.

Other objects and advantages will be more fully apparent from the following disclosure and appended claims.

SUMMARY OF THE INVENTION

The invention disclosed provides a novel method and apparatus for applying a concentrated heated fluid first to the leading end seam and then to the trailing end seam of a heat shrinkable film wrapped around a product which is one of a series of products. The apparatus has a pair of operative segments one of which is adapted to shrink the leading end seam and the other of which is adapted for shrinking the trailing end seam of each successively conveyed product. Each segment of the apparatus has a sensor which sends a signal to a programmable microprocessor to indicate the presence of the leading end of a product. In the first segment, when a film-wrapped product is sensed on the apparatus conveyor, a nozzle moved by a microprocessor controlled servomotor drive is caused to travel in synchronization with the product being moved on the conveyor and direct a flow of concentrated heated fluid to the underside of the leading end seam. At the completion of the nozzle's travel for a preset distance, the flow of heated fluid is shut off and the nozzle is returned by its servomotor drive to its starting point to await a second product. The sensor in the second apparatus segment sends a similar signal to the microprocessor which causes the second segment nozzle to supply heated fluid and the corresponding microprocessor controlled servomotor drive to begin to move when the product has passed by the second nozzle and the second segment sensor no longer senses the product. In this way, the second segment nozzle travels in synchronization with the trailing end seam of the film.

BRIEF DESCRIPTION OF THE DRAWINGS

FIG. 3 is a top plan view of a product comprising a tray packed with poultry parts which is wrapped in a heat shrinkable film, shown before film shrinking.

FIG. 4 is a top plan view of the product of FIG. 3 after shrinking of the film according to the prior art wherein film corners are left extended.

FIG. 5 is a top plan view of the product of FIG. 3 after shrinking of the film according to the present invention.

DETAILED DESCRIPTION OF THE INVENTION AND PREFERRED EMBODIMENTS THEREOF

The problems dealt with in the main objects of the invention, particularly with regard to causing the shrinking of film wrapped around a product while leaving the film corners extending outwardly, are illustrated in FIGS. 3 and 4. FIG. 3 depicts a product wrapped in a heat shrinkable film before film shrinking, and FIG. 4 depicts the same product after shrinking according to the prior art.

In FIG. 3, product P is shown as a tray T packed with poultry parts and wrapped in a heat shrinkable film F having leading transverse end seam L and trailing transverse end seam R. Tray T is bordered with stiffening flange E. Prior to the operation of shrinking film F, seams L and R typically extend outwardly from product P and each seam terminates in a pair of corners C.

In the typical shrinking apparatus and method of the prior art, when film F which is wrapped around a product is shrunk, corners C tend to remain extended beyond flange E, as seen in FIG. 4. The degree of corner C extension varies in particular situations, the illustrated extension of FIG. 4 being somewhat emphasized for purposes of discussion. This condition of extended corners somewhat impairs the appearance and marketability of the product. Conversely, the apparatus and method of the present invention provide a finished package (see FIG. 5) in which corners C are effectively tucked downwardly and inwardly to reside beneath tray flange E, and at the same time the tray bottom and printed panels (not shown) in film F are not distorted. A further depiction of the results of the present invention is shown in side elevation in FIG. 7.

Figure 6:
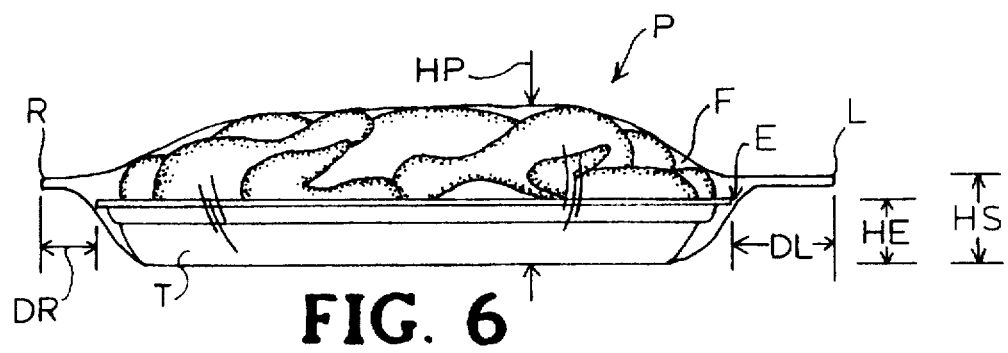
FIG. 6 is a side elevation view of a product comprising a tray packed with poultry parts to a comparatively high level and which is wrapped in a film which has not been shrunk.

A typical "high profile" package wrapped in heat shrinkable film F is shown in side elevation in FIG. 6 before shrinking has been accomplished. A "high profile package" is treated for reference as one in which, height HP of product P is more than twice the height HE of tray flange E, so that height HS of end seams L and R is higher than the height HE of flange E. In wrapping a high profile package, the prior operation of transverse seam sealing generally results in the extension DL of leading end seam L being longer than the extension DR of trailing end seam R.

Figure 7:
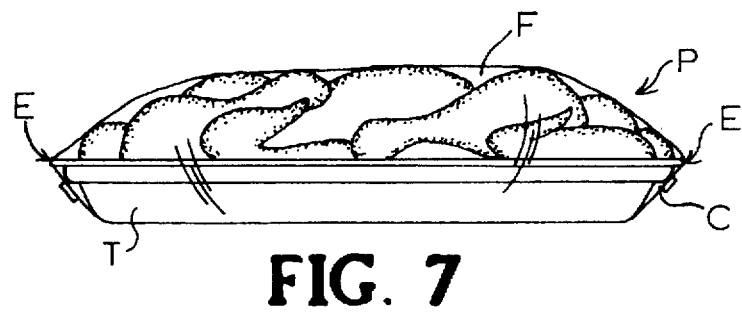
FIG. 7 is a side elevation view of the tray of FIG. 5 after shrinking of the film according to the present invention.

The desired characteristics of the package after shrinking the portions of film F below end seams L and R as shown in FIGS. 5 and 7 are accomplished through use of a shrink apparatus 10 of the present invention as illustrated in front elevation in FIG. 1 and in plan view in FIG. 2. Shrink apparatus 10 is generally supported on and defined by frame 12. The operative components of shrink apparatus 10, to be described below, are coordinated and controlled through programmable microprocessor 14, which communicates with each of the components of apparatus 10 via bus 16. Connections to each component are not shown for simplicity of the illustration. Conveyor 20 is driven continuously by a driver (not shown) around a path defined by sprockets 22, mounted on frame 12, to convey a series of wrapped products P in the direction indicated by arrow X. Tensioning sprocket 24 is pressed into contact with conveyor 20 by spring 26.

Shrink apparatus 10 is essentially configured in two segments, labelled S-1 and S-2, which have similar components and are physically similar, but which are capable of being operated independently and differently by microprocessor 14. Referring initially to FIGS. 1 and 2 and segment S-1, nozzle 32, terminating at aperture 34, is positioned closely beneath horizontal conveyor 20. Nozzle 32 encloses heater 38 so that air passing through duct 36 and nozzle 32 from air source 40, for example a centrifugal fan, is heated immediately prior to its substantially vertical discharge through aperture 34 as a directed flow of hot air. Alternatively, nozzle 32 may be supplied with a heated fluid such as steam or water. If it is desired that a heated fluid other than air be used, air source 40 will be replaced by a steam or heated water source and heater 38 will be eliminated. Heater 38 in the preferred embodiment is a finned electrical resistance heater as is well known. Nozzle 32 and aperture 34 are appropriately configured to focus the flow of heated air or other heated fluid passing outward therefrom. Conveyor 20 is formed of a series of spaced apart bars which define passages as large as or larger than the separating bars (see FIG. 2). For example, conveyor 20, in the preferred embodiment, is formed of a series of round, parallel metal bars of approximately ¼ inch diameter which are separated from one another by a space of approximately ¾ inch.

A sensor 30, for example a photoelectric cell, is positioned so that a light beam passing between transmission and reception portions thereof passes across conveyor 20 at a level to be intercepted by each in a series of wrapped products P being conveyed by conveyor 20. Sensor 30 is connected to microprocessor 14 via bus 16, which also carries a connector from microprocessor 14 to servomotor 56.

Servomotor 56 upon receiving the appropriate signal from microprocessor 14 is adapted to drive traverse belt 50 through sprocket 52 and cause nozzle 32 to travel in the same direction and at substantially the same speed as wrapped product P on conveyor 20. Nozzle 32 is firmly connected by clamp 54 to belt 50 which is preferably in the form of a timing belt. The signal from microprocessor 14 is timed to move nozzle 32 linearly and synchronously with leading end seam L so that the heated fluid driven as a substantially vertical flow through aperture 34 impinges leading end seam L and adjacent lower leading area of film F. This defined relationship between leading end seam L and aperture 34 is maintained by the speed of travel of traverse belt 50 being coordinated with the movement of conveyor 20.

Air source 40 is provided with a shut-off valve 62 which is moved through actuator 64, similar controls being substituted in the case of a different heated fluid. Actuator 64 may be a pneumatic cylinder or other linear motion device.

Air source 40, in the preferred embodiment being a centrifugal blower, is driven by a motor, not shown. Air source 40 is fixedly mounted to machine frame 12. Conversely, nozzle 32 and duct 36 are moved cyclically forward and back by belt 50. A flexible connection 42, for example a flexible, tubular sleeve made of an impregnated fabric, is affixed to blower outlet 44 and to duct inlet 46. In FIG. 1, flexible connection 42 forming part of segment S-1 is shown fully extended whereas flexible connection 42' forming part of segment S-2 is shown partially collapsed. Other types of flexible connectors, such as, for example, a bellows or a telescoping tube with sliding seals, would also be operable. Duct inlet 46 is formed smaller than blower outlet 44 so as to be able to enter and telescope therewithin. In the configuration of the preferred embodiment, flexible connection 42 is placed over and sealed to the outside of duct inlet 46, then doubled back over itself to be sealed to the outside of blower outlet 44. By force of air pressure from air source 40, flexible connection 42 balloons outwardly so as not to interfere with the reciprocating action of duct 36 and nozzle 32 as they are moved cyclically.

The apparatus of segment S-1 is similar to that of segment S-2. While the preferred embodiment is shown with a separate source of air (40 and 40') for each segment of the invention, it is recognized that a single air source with appropriate valve controls could serve the same purpose. It can be said that in general nozzle 32 is moved back and forth in segment S-1 in correspondence with the presence and movement of the leading end seam of product P and connector 42 extends to be as pictured in FIG. 1 or contracts to be as portrayed by connector 42'. Nozzle 32' of segment 11 moves in correspondence with the presence and movement of the trailing end seam of product P.

Figure 1:
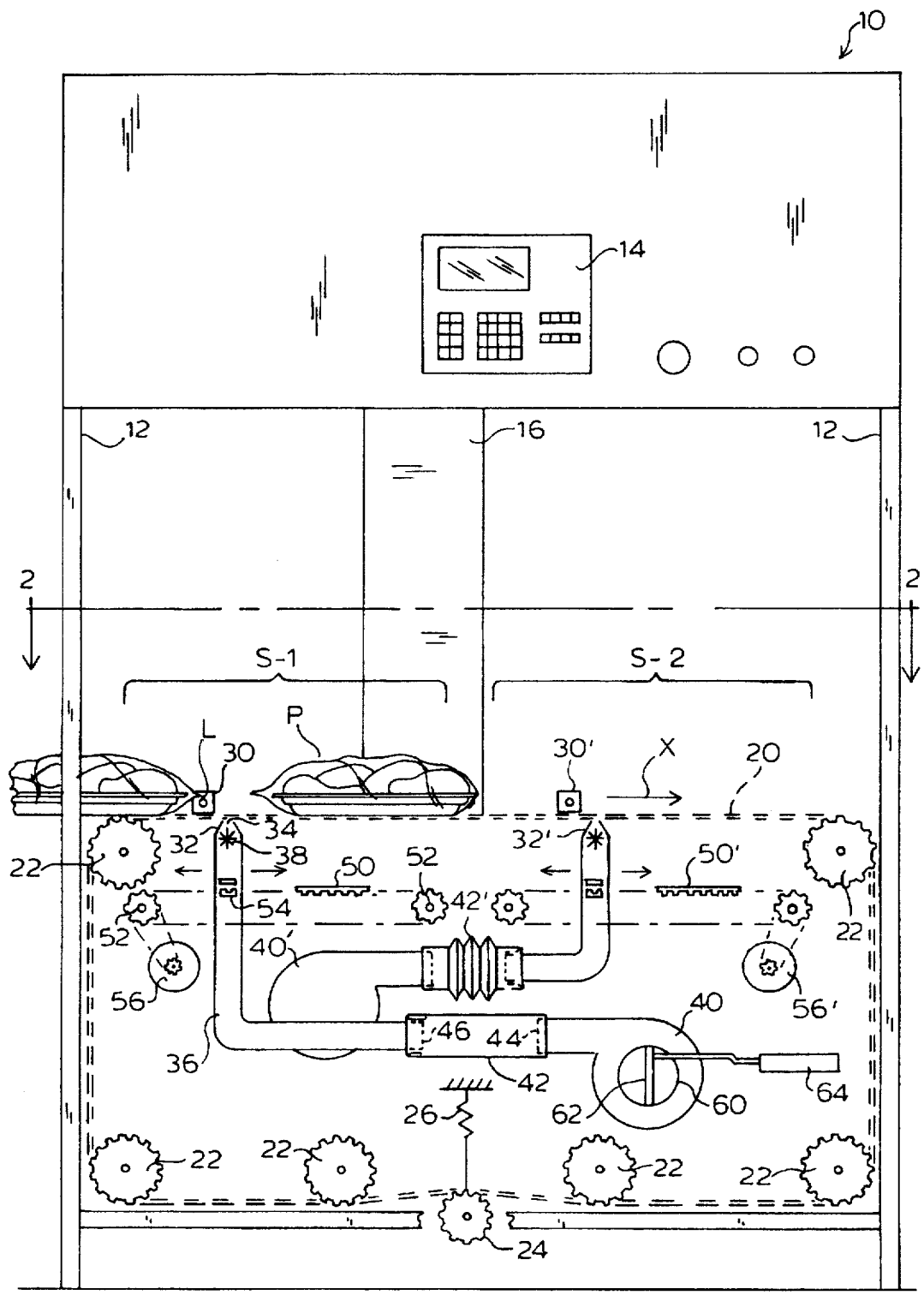
FIG. 1 is a front elevation view of an apparatus for shrinking according to the present invention and illustrated as comprising two segments connected to a common microprocessor.
Figure 2:
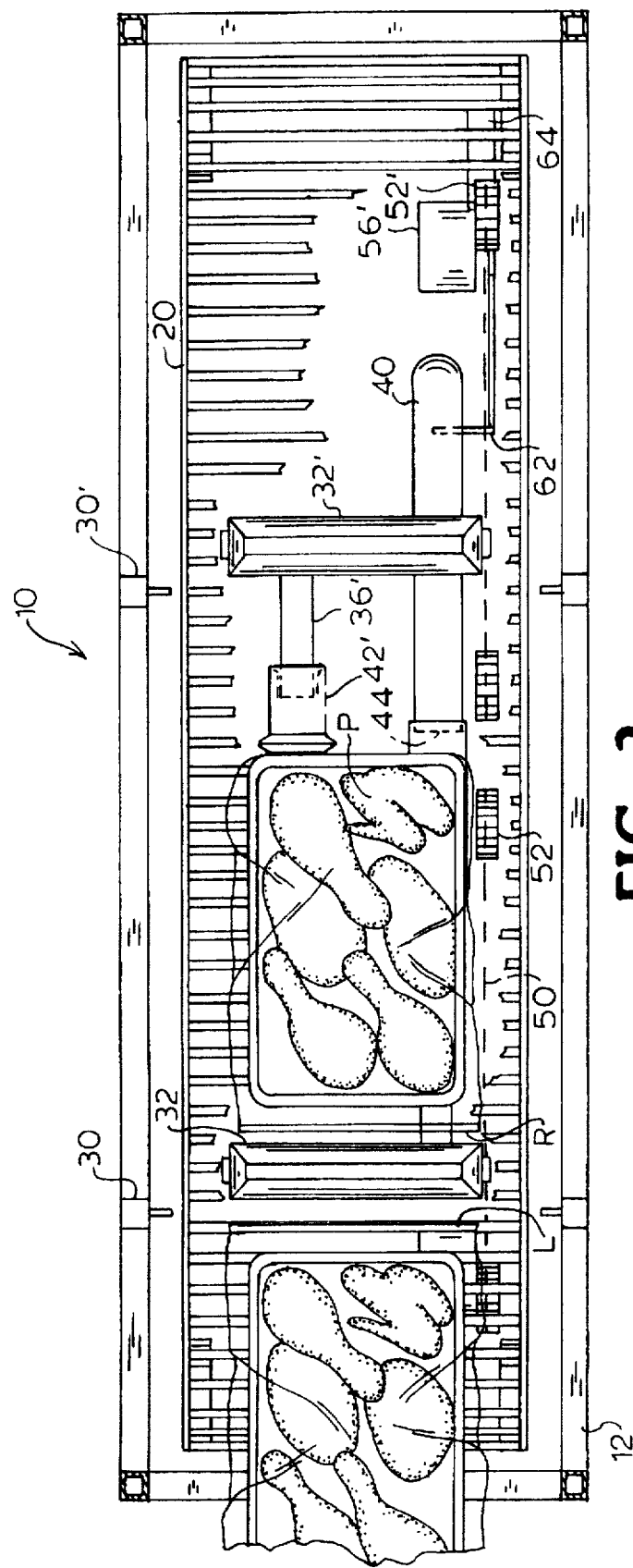
FIG. 2 is a plan view of the invention apparatus taken in the direction of line 2—2 of FIG. 1 and partially broken away to expose lower components thereof.

Having described the apparatus of the invention as seen in FIGS. 1 and 2, reference is now made to the method steps, shown diagrammatically in FIGS. 8A-8E. It is noted that the primary object of causing the film below leading end seam L and trailing end seam R to shrink while other portions of film are left unshrunk is enhanced by keeping the conveyor and nozzle mechanism open to the surrounding environment rather than to enclose those components in a housing or tunnel. Thus, the heated fluid discharged from nozzle 32 dissipates, rather than collecting, and thereby avoids creating a hot ambient atmosphere around product P. In addition, such an open structure enables conveyor 20 which carries the products through the invention apparatus to remain substantially cool.

Figure 8A:
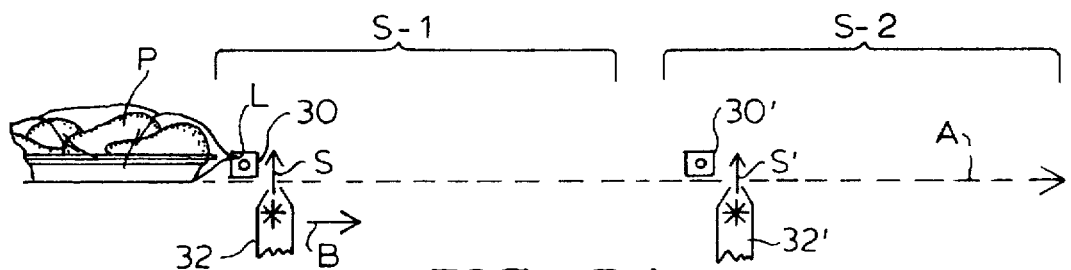
FIGS. 8A–8E illustrate by means of a schematic representation the sequence of operations incorporated in the method of the invention.
Figure 8B:
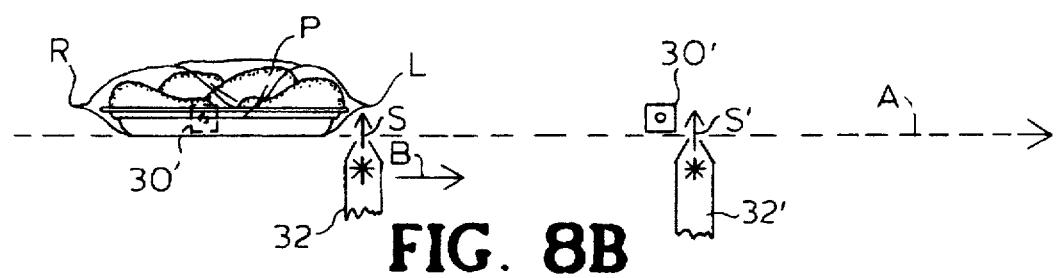
Figure 8C:
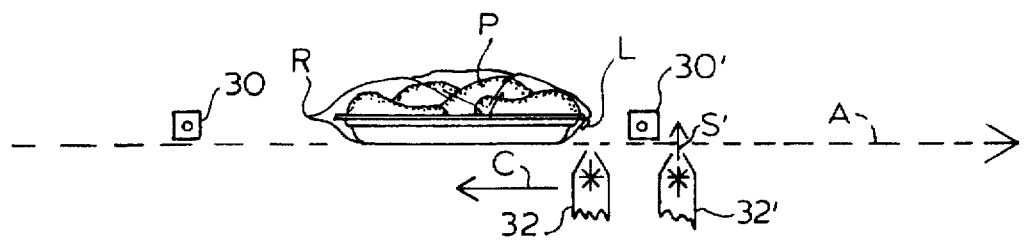

FIGS. 8A-8E show a series of schematic diagrams depicting the major steps of the invention method. The path of the horizontal conveyor is shown schematically by dashed-line arrow A to the right as shown. The operations are shown as divided to follow segment I and segment II through the several steps. FIG. 8A illustrates a wrapped product P intercepting the light beam of photosensitive cell 30, which sends a corresponding signal to microprocessor 14 (see FIG. 1). At the time product P intercepts the photocell signal, heated fluid is flowing outwardly from nozzle 32, as shown by arrow S. A responsive signal from microprocessor 14 actuates servomotor 56 and causes nozzle 32 to be moved from left to right in synchronization with wrapped product P, as shown in FIGS. 8A and 8B by arrow B. At the completion of its travel, shown in FIG. 8C, the fluid flow through nozzle 32 is stopped and the travel thereof is reversed by reversing servomotor 56 causing belt 50 to move in a direction to return nozzle 32 to its starting point as shown by arrow C. It is recognized that while the travel of nozzle 32 in the direction of arrow X (FIG. 1) needs to be at a speed coordinated with the speed of wrapped product P, the return travel of nozzle 32 is not so constrained. Thus, in the preferred embodiment, the return travel of nozzle 32 is accomplished at a speed which is faster than that of its forward travel to allow the maximum portion of the time cycle to be used for forward travel.

Figure 8D:
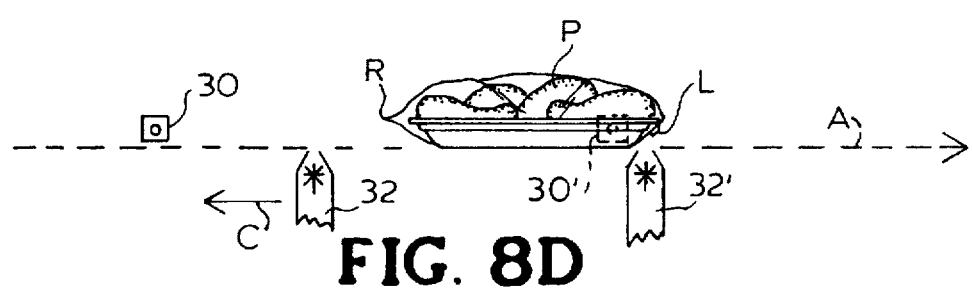

During the process described above, the substantially vertically directed and focused heated fluid from nozzle 32 impinges the film at and below leading end seam L (see FIG. 8B) to cause the film portion below end seam L to shrink into close proximity to product P. As wrapped product P enters machine segment II and passes photoelectric cell 30', as shown in FIG. 8D the heated fluid represented by arrow S' which had been flowing through nozzle 32' is stopped so that the film on the bottom of wrapped product P is not caused to shrink as product P passes over nozzle 32' and any printing thereon is kept substantially free of distortion.

Figure 8E:
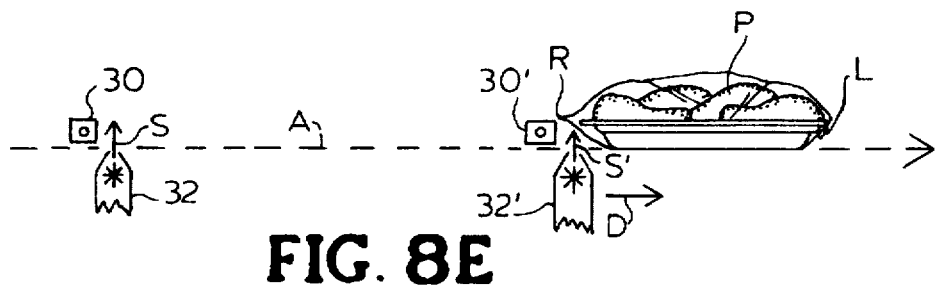

When wrapped product P has passed photoelectric cell 30', as illustrated in FIG. 8E, microprocessor 14 activates heated fluid flow S' and signals servomotor 56' to drive belt 50' so as to cause nozzle 32' to be moved from left to right, as shown by arrow D, in synchronization with travel of wrapped product P and the heated fluid from nozzle 32' to impinge on and shrink the film below trailing end seam R. At the completion of its travel, servomotor 56' is signalled by microprocessor 14 to reverse, and nozzle 32' is moved back to its starting point without stopping the flow S' of heated fluid (return movement not shown). It is recognized that in certain situations, it may be preferred to stop the flow of heated fluid for the time that nozzle 32' travels back to its starting point. Whereas in the case of heated air being the fluid of choice, air flow during most of the cycle time allows heater 38 (see FIG. 1) to remain on, steam or water from a remote heat source may be stopped whenever not being used to shrink the film.

The logic sequence employed by programmable microprocessor 14 (FIG. 1) to perform the steps of FIGS. 8A-8E may be characterized as follows:

A. Instructions For Machine Segment S-1

Step 1. Is photocell light beam intercepted?
 (a) No: go to step 1.
 (b) Yes: go to step 2.

Step 2. Start nozzle traverse drive. Go to step 3.

Step 3. Is nozzle traverse at end of stroke?
 (a) No: go to step 3.
 (b) Yes: go to step 4.

Step 4. Shut fluid supply off. Reverse nozzle traverse drive. Go to step 5.

Step 5. Is nozzle at starting point?
 (a) No: go to step 5.
 (b) Yes: go to step 6.

Step 6. Turn fluid supply on. Stop nozzle traverse drive. Go to
step 1.

B. Instructions For Machine Segment S-2

Step 1. Is photocell light beam interrupted?
 (a) No: go to step 1.
 (b) Yes: shut fluid supply off. Go to step 2.

Step 2. Is photocell light beam interrupted?
 (a) Yes: go to step 1.
 (b) No: was photocell light beam interrupted on pervious cycle?
  (i) No: go to step 1.
  (ii) Yes: go to step 3.

Step 3. Turn fluid supply on. Start nozzle traverse drive. Go to step 4

Step 4. Is nozzle traverse at end of stroke?
 (a) No: go to step 3.
 (b) Yes: go to step 5.

Step 5. Reverse nozzle traverse drive. Go to step 6.

Step 6. Is nozzle at starting point?
 (a) No: go to step 6.
 (b) Yes: go to step 7.

Step 7. Stop nozzle transverse drive. Go to step 1.

Subsequent to the application of the method by use of the apparatus of the present invention, it will typically be desirable to shrink the balance of the film wrapped around product P by means of heated air, steam, water or radiant energy. The invention recognizes that while radiant heat energy is useful for general film shrinking, where the heat must be activated and deactivated rapidly, other heating media are more suitable. By causing the film adjacent leading end seam L to be shrunk before the shrinking of film adjacent trailing end seam R, the leading end seam film has sufficient time in which to cool before being strained by the later step of shrinking the top and bottom film surfaces as product P enters the subsequent shrink phase. The film adjacent trailing end seam R has a similar time in which to cool after localized shrinking.

The description of the method and apparatus of the present invention relates to an industrial packaging operation in which the time in which to wrap a product is of the order of one second, thus the speed to shrink the wrapping film must be similarly short. By application of the invention disclosed, an effective and efficient packaging operation is provided and the objects are achieved of shrinking the film so that the end seams and corners are tucked downwardly and inwardly while keeping the top and bottom film surface areas from distorting. The components of which shrink apparatus 10 is built, i.e. photocells, motors, fans, heaters, etc. are generally available and familiar to one skilled in the art, and thus are not specifically described or identified herein.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A method for shrinking selected spaced apart portions of film wrapped around a product which is one of a series of products being sequentially conveyed along a path in a selected direction, said method comprising the steps of:
   (a) providing at a first position along said path a first movably mounted nozzle;
   (b) establishing a first flow of heated fluid through said first nozzle;
   (c) conveying said product along said path at a selected speed, said product being positioned during said conveying to cause said first flow of heated fluid to impinge one of said selected portions of film;
   (d) moving said first nozzle substantially at said selected speed and in said selected direction while continuing to convey said product so positioned so that said first flow of heated fluid continues to impinge said one of said selected portions of film;
   (e) discontinuing said first flow of heated fluid when said first nozzle reaches a second position along said path downstream of said first position;
   (f) returning said first nozzle to said first position;
   (g) providing at a third position along said path downstream of said second position a second movably mounted nozzle;
   (h) establishing a second flow of heated fluid through said second nozzle when a second of said selected portions of film has reached said third position and maintaining said product positioned during continued conveying to cause said second flow of heated fluid to impinge said second of said selected portions of film;
   (i) substantially simultaneously with establishing said second flow of heated fluid moving said second nozzle substantially at said selected speed in said selected direction while continuing to convey said product along said path so that said second flow of heated fluid continues to impinge said second of said selected portions of film; and when said second nozzle reaches a fourth position along said path downstream of said third position returning said second nozzle to said third position.

2. The method as described in claim 1, further including the step after returning said second nozzle to said third position, of discontinuing the second flow of heated fluid from said second nozzle when a subsequent film wrapped product has moved to said third position.

3. The method as described in claim 1, further including the steps of mounting a sensor proximate said path and capable of sensing a product at said first position and generating a signal in response thereto and utilizing said signal to initiate the movement of said first nozzle in said selected direction.

4. The method as described in claim 1, further including the steps of mounting a sensor proximate said path and capable of sensing a product at said third position and generating a signal in response thereto and utilizing said signal to initiate the movement of said second nozzle in said selected direction.

5. A method for shrinking leading and trailing end seams in a heat shrinkable film wrapped around a product which is one of a series of film wrapped products sequentially conveyed at a selected speed in a selected direction along a path, comprising the steps of:
   (a) providing at a first position adjacent said path a first nozzle connected to emit a first controllable flow of heated fluid and mounted so as to be moveable adjacent said path in said selected direction;
   (b) conveying said film wrapped product along said path at said selected speed and causing said leading end seam of said film to intersect said first flow of heated fluid emitted by said first nozzle while at said first position;
   (c) while continuing to convey said product along said path at said selected speed, moving said first nozzle adjacent said path in said selected direction at substantially said selected speed from said first position to a second position during which movement said leading end seam continues to intersect said first flow of heated fluid;
   (d) while continuing to convey said product along said path at said selected speed, stopping said first flow of heated fluid from said first nozzle at said second position and returning said first nozzle to said first position;
   (e) providing at a third position adjacent said path a second nozzle connected to emit a second controllable flow of heated fluid and mounted so as to be moveable adjacent said path in said selected direction;
   (f) while continuing to convey said product along said path at said selected speed activating said second flow of heated fluid when said product has substantially passed said third position to cause said trailing end seam of said film wrapped product to intersect said second flow of heated fluid and upon said activation moving said second nozzle adjacent said path in said selected direction at substantially said selected speed from said third position to a fourth position during which movement said trailing end seam continues to intersect said second flow of heated fluid; and
   (g) while continuing to convey said product along said path at said selected speed returning said second nozzle to said third position.

6. An apparatus for shrinking end seams in a film wrapped around each product in a series of film wrapped products, said apparatus comprising:

(a) a machine frame;

(b) a driven conveyor mounted to said machine frame so as to convey each said product in a selected direction at a selected speed;

(c) first traversing means mounted to said frame for moving in said selected direction in response to a first signal and moving opposite to said selected direction in response to a second signal;

(d) a first nozzle mounted to said first traversing means adjacent said conveyor;

(e) a first source of fluid connected in fluid communication with said first nozzle in a manner to permit said first nozzle to move and to emit a flow of heated fluid;

(f) second traversing means mounted to said frame for moving in said selected direction in response to a third signal and moving opposite to said selected direction in response to a fourth signal;

(g) a second nozzle mounted to said second traversing means adjacent said conveyor;

(h) a second source of fluid connected in fluid communication with said second nozzle in a manner to permit said second nozzle to move and to emit a flow of heated fluid; and (i) a controller connected to receive said signals and adapted in response to said signals to control the operation of said driven conveyor, said first and second traversing means and said first and second sources of fluid.

7. The apparatus claimed in claim 6, in which said fluid is air and said apparatus further comprises a heater mounted within each of said first and second nozzles.

8. The apparatus claimed in claim 6, in which said first and second traversing means each comprise a driven reciprocating support adapted for moving the respective said first and second nozzles cyclically in said selected direction and alternately in a direction substantially opposite thereto.

9. The apparatus claimed in claim 6 further comprising a first sensor positioned adjacent said conveyor so as to sense the presence of said product as a leading transverse seam thereof passes across said first nozzle and a second sensor positioned adjacent said conveyor so as to sense the passing of said product beyond said second nozzle, each said sensor being operative to generate and transmit a signal which, when received by said controller causes said controller to initiate the movement of said respective first and second nozzles by said respective first and second traversing means.

* * * * *